United States Patent
Hammer et al.

(10) Patent No.: US 10,467,173 B2
(45) Date of Patent: Nov. 5, 2019

(54) HOT PLUGGING OF VIRTUAL BRIDGES IN A VIRTUAL PCI SYSTEM

(71) Applicant: Red Hat Israel, Ltd., Raanana (IL)

(72) Inventors: Gal Hammer, Kfar Saba (IL); Marcel Apfelbaum, Afula (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/840,869

(22) Filed: Dec. 13, 2017

(65) Prior Publication Data
US 2019/0179788 A1 Jun. 13, 2019

(51) Int. Cl.
| | |
|---|---|
| G06F 13/40 | (2006.01) |
| G06F 13/42 | (2006.01) |
| G06F 9/455 | (2018.01) |

(52) U.S. Cl.
CPC ...... G06F 13/4081 (2013.01); G06F 9/45558 (2013.01); G06F 13/4282 (2013.01); *G06F 2009/45579* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 5,764,924 A | * | 6/1998 | Hong | .................... G06F 13/387 710/300 |
| 6,247,079 B1 | | 6/2001 | Papa et al. | |
| 9,262,363 B2 | | 2/2016 | Luo et al. | |
| 9,575,919 B2 | * | 2/2017 | Akaike | .................... G06F 3/06 |
| 9,779,050 B2 | | 10/2017 | Apfelbaum et al. | |
| 2014/0244885 A1 | * | 8/2014 | Tsirkin | ................ G06F 13/4027 710/306 |

FOREIGN PATENT DOCUMENTS

| | | |
|---|---|---|
| CN | 104317759 A | 1/2015 |
| WO | 2012/026939 A1 | 3/2012 |

OTHER PUBLICATIONS

"Intel® Virtualization Technology for Directed I/O," Jun. 2016, https://www.intel.com/content/dam/www/public/us/en/documents/product•specifications/vt-directed-io-spec.pdf.
Galowicz, J., "Live Migration of Virtual Machines between Heterogeneous Host Systems," RWTH Aachen University, http://hypervisor.org/thesis-galowicz.pdf.

* cited by examiner

*Primary Examiner* — Idriss N Alrobaye
*Assistant Examiner* — Dayton Lewis-Taylor
(74) *Attorney, Agent, or Firm* — Kilpatrick Townsend & Stockton LLP

(57) ABSTRACT

Some examples can enable virtual bridges to be hot plugged into a virtual Peripheral Component Interconnect (vPCI) system. For example, a number of subordinate buses that are connected to a vPCI bridge in the vPCI system can be determined. The vPCI system can be for a virtual machine. A parameter value can then be generated by adding an integer to the number of subordinate buses that are connected to the vPCI bridge. The integer can be a predefined number of additional subordinate buses to enable to be connected to the vPCI bridge. The parameter value can then be assigned to the vPCI bridge. This may enable additional virtual bridges to be hot plugged into the vPCI system at a later time. For example, a new virtual bridge can be added to the vPCI system using the parameter value for the vPCI bridge.

21 Claims, 4 Drawing Sheets

HOT PLUGGING OF VIRTUAL BRIDGES IN A VIRTUAL PCI SYSTEM

TECHNICAL FIELD

The present disclosure relates generally to virtual machine task or process management. More specifically, but not by way of limitation, this disclosure relates to hot plugging of virtual bridges in a virtual Peripheral Component Interconnect (PCI) system.

BACKGROUND

A virtual machine can be a substantially isolated environment that has its own operating system, software applications, and virtualized hardware. For example, a virtual machine can have a virtual Central Processing Unit (vCPU), a virtual Random Access Memory (vRAM), and other components. In some cases, a virtual machine can have a virtual Peripheral Component Interconnect (vPCI) system for attaching virtual hardware devices to the virtual machine. An example of the vPCI system can be a virtual PCI express system. The vPCI system can include several virtual buses connected together by virtual bridges to conceptually form a tree-like structure. Each virtual bridge can directly connect a bus that is positioned immediately above the virtual bridge in the tree-like structure to another bus that is positioned immediately below the virtual bridge in the tree-like structure. The bus that is positioned immediately above the virtual bridge can be referred to as a "primary bus" for the virtual bridge, and the bus that is positioned immediately below the virtual bridge can be refer to as a "secondary bus" for the virtual bridge.

At startup time, the virtual machine (e.g., guest firmware of the virtual machine) can scan the vPCI system to determine the number of virtual buses that are present in the vPCI system. This number can be referred to as the virtual-bus maximum, and represent the maximum number of virtual buses that can be connected to the vPCI system. For example, if there are five virtual buses present in the vPCI system at startup time, the virtual-bus maximum can be 4 (the range from 0 to 4). The virtual-bus maximum can be a fixed value that is unchangeable after the virtual machine starts up. The virtual machine can rely on the virtual-bus maximum to perform a variety of functions.

DETAILED DESCRIPTION

Figure 1:
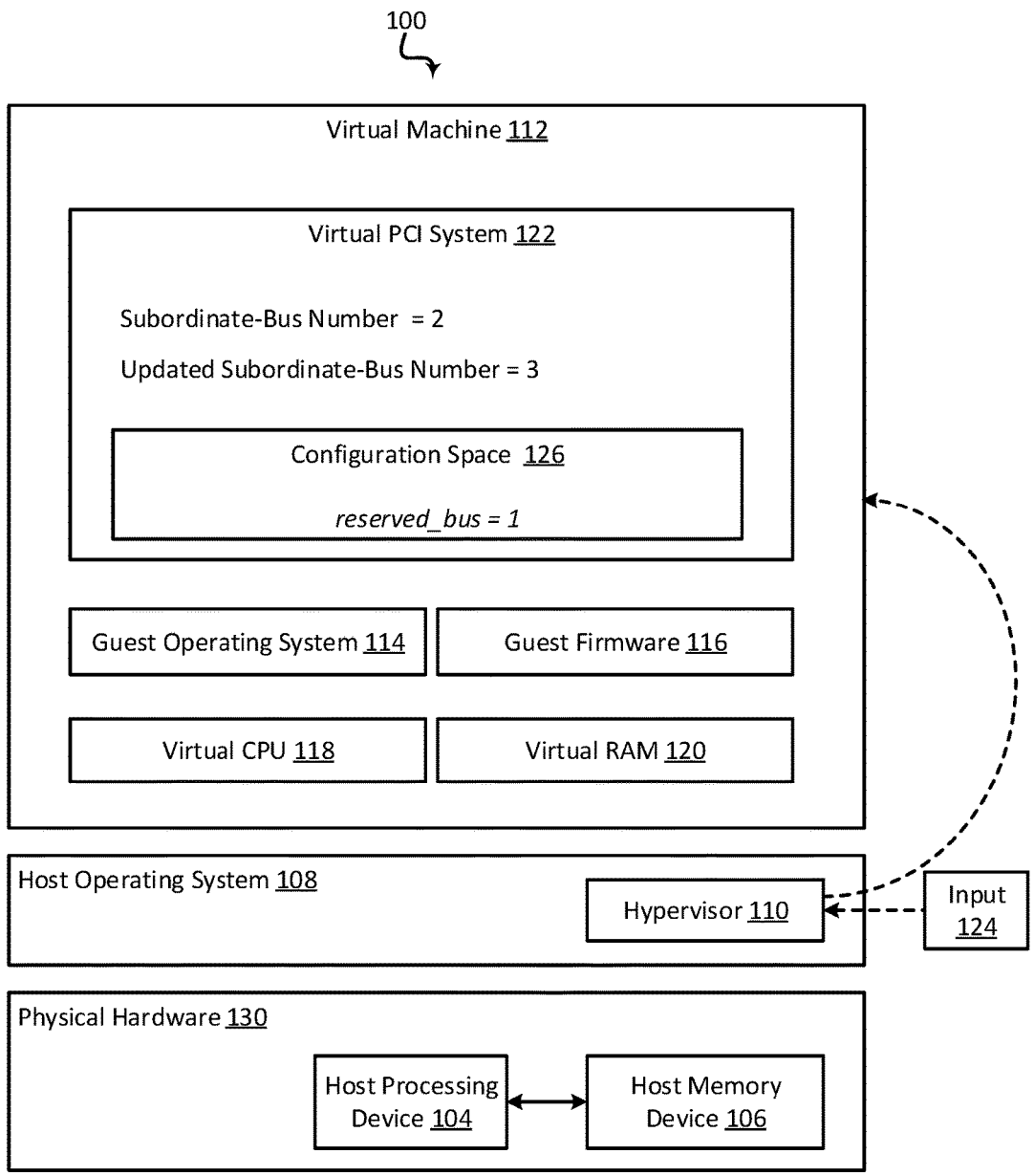
FIG. 1 is a block diagram of an example of a system for enabling hot plugging of virtual bridges according to some aspects.

There can be disadvantages to determining a virtual-bus maximum only based on the virtual buses that are connected to a vPCI system while a virtual machine is starting up. For example, this can prevent additional virtual buses from being added to the vPCI system at runtime, since the virtual-bus maximum is a fixed upper limit on the number of virtual buses that can be included in the vPCI system. In turn, this can prevent virtual bridges from being hot plugged into the vPCI system, because the vPCI system cannot create secondary buses for the virtual bridges. In this context, hot plugging involves adding a virtual bridge to the vPCI system during an operational phase of the virtual machine (e.g., as opposed to a startup phase in which the vPCI system is initialized or configured for initial use by the virtual machine). Preventing hot plugging of virtual bridges into the vPCI system can result in the virtual machine having to be rebooted every time a user wishes to add more virtual buses to the vPCI system, which can be inconvenient, time consuming, and expensive.

Some examples of the present disclosure overcome one or more of the abovementioned issues by enabling virtual bridges to be hot plugged into a vPCI system during runtime. This can enable a user to add more virtual buses to the vPCI system as desired, without having to reboot the virtual machine.

In one particular example, a computing device can run a hypervisor for provisioning a virtual machine. The hypervisor can be a software layer that is conceptually positioned above a physical layer (e.g., the hardware) of the computing device and below the virtual machine. The hypervisor can interface between the physical layer and the virtual machine. The hypervisor can receive user input indicating an amount of extra virtual buses to reserve for later inclusion into the vPCI system at runtime. These extra virtual buses can be referred to as reserved buses. For example, the user input can specify that there are to be 3 reserved buses. In response to the user input, the hypervisor can set a capability property in a vPCI configuration space of the vPCI system. The capability property can indicate one or more PCI capabilities associated with the vPCI system. The capability property can specify the number of reserved buses indicated by the user input. The hypervisor can then provision the virtual machine.

As the virtual machine starts up, guest firmware of the virtual machine can scan the vPCI system and assign a primary-bus number, a secondary-bus number, and a subordinate-bus number to each respective virtual bridge in the vPCI system. The primary-bus number can identify a primary bus for the respective virtual bridge. The secondary-bus number can identify a secondary bus for the respective virtual bridge. The subordinate-bus number can indicate the number of subordinate buses that are below the secondary bus in the tree-like structure of the vPCI system and indirectly connected to the respective virtual bridge (via other virtual bridges).

The virtual machine can also query the vPCI configuration space to determine if the capability property is set. If so, the virtual machine can increase the subordinate-bus number of each virtual bridge by the amount of reserved buses indicated by the capability property. As a particular example, if the subordinate-bus number for a particular virtual bridge is 2, and the number of reserved buses indicated by the capability property is 3, the virtual machine can increase the subordinate-bus number for the virtual bus to 5 (2+3=5). This process can be repeated for some or all of the virtual bridges in the vPCI system. In the above example, if the particular virtual bridge has two subordinate buses actually connected to it, but an increased subordinate-bus number is 5, this can enable up to 3 additional subordinate buses to be added to the vPCI system later, which in turn can allow for 3 additional virtual bridges to be hot plugged into the vPCI system.

For example, if a new virtual bridge is connected to the particular virtual bridge during runtime, the virtual machine can determine an unused bus number in a range between the primary-bus number and the increased subordinate-bus number for the particular virtual bridge. More specifically, each integer in the range between the primary-bus number (e.g., 0) and the subordinate-bus number (e.g., 5) can serve as an identifier for a particular bus (e.g., Bus 0, Bus 1, . . . , Bus 5) in the vPCI system. The virtual machine can then assign the unused bus number as the secondary-bus number for the new virtual bridge, thereby enabling hot plugging of the new virtual bridge.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for enabling hot plugging of virtual bridges according to some aspects. The system 100 includes physical hardware 102, such as a host processing device 104 communicatively coupled to a host memory device 106. The physical hardware 102 can execute a host operating system 108, such as a Linux operating system. And, in this example, the host operating system 108 can execute a hypervisor 110. But in other examples, the physical hardware 130 can execute the hypervisor 110 separately from, or exclusive of, the host operating system 108. The hypervisor 110 can provision one or more virtual machines, such as virtual machine 112.

The virtual machine 112 can have its own software, which can be referred to as guest software. For example, the virtual machine 112 can have its own, isolated operating system, which can be referred to as a guest operating system 114. An example of the guest operating system 114 can be Red Hat™ Linux. In some examples, hot plugging a virtual bridge into a vPCI system 122 can involve adding the virtual bridge while the guest operating system 114 is up and running. The virtual machine 112 can additionally or alternatively have its own isolated firmware, which can be referred to as guest firmware 116. Examples of the guest firmware 116 can include basic input/output system (BIOS) firmware, open virtual machine firmware (OVMF), or both. The virtual machine 112 can also include a vCPU 118, a vRAM 120, and a vPCI system 122.

Figure 2:
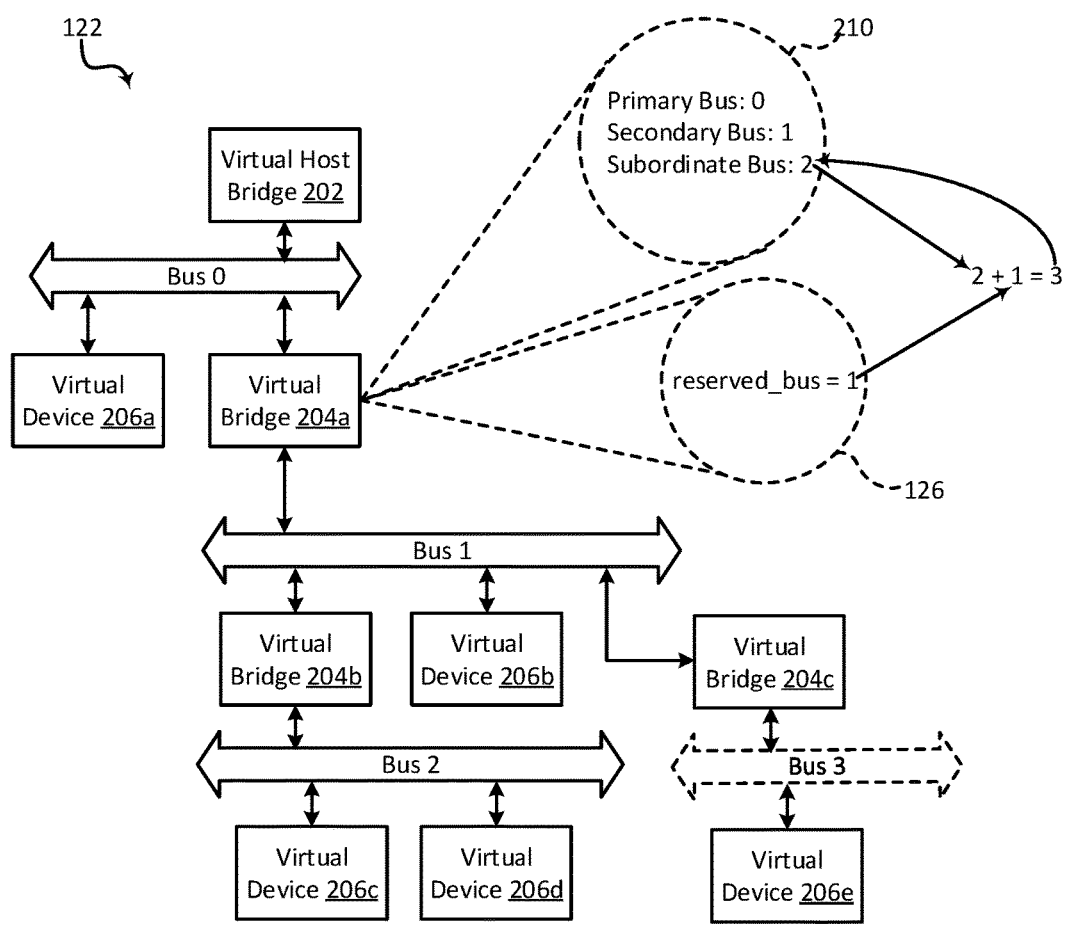
FIG. 2 is a block diagram of an example of a virtual PCI system according to some aspects.

An example of the vPCI system 122 is shown in FIG. 2. The vPCI system 122 can include a virtual host bridge 202 for connecting the vCPU and vRAM of the virtual machine 112 to a virtual root bus, which is designated as Bus 0 in FIG. 2. An example of the virtual host bridge 202 can be a virtual PCI host bridge. The vPCI system 122 can also include other virtual buses (e.g., Bus 1 and Bus 2) connected to Bus 0 by nested virtual bridges 204a-b. And virtual devices 206a-d can be connected to the virtual buses. In some examples, the virtual buses and virtual devices can be virtual PCI buses and virtual PCI devices, respectively. The virtual bridges can be virtual PCI bridges, such as virtual PCI-PCI bridges. The vPCI system 122 can have a tree-like structure (e.g., a hierarchical structure) in which the virtual host bridge 202 is the top of the tree, the virtual devices 206a-d are the leaves of the tree, and the virtual buses are the branches.

It may be desirable to configure the vPCI system 122 to enable hot plugging of additional virtual bridges and buses, such as virtual bridge 204c and Bus 3, into the vPCI system 122. Some examples of the present disclosure can enable this type of hot plugging.

For example, referring to FIGS. 1-2 together, the hypervisor 110 can receive input 124 indicating an amount of extra virtual buses to reserve for later inclusion into the vPCI system 122. The hypervisor 110 can receive this input 124 as user input or from a software application. The hypervisor 110 can then communicate the amount of extra virtual buses to reserve to the virtual machine 112, as indicated by the dashed arrow from the hypervisor 110 to the virtual machine 112. In some examples, the hypervisor 110 can communicate this information to the virtual machine 112 via a virtual communication channel with the virtual machine 112. In other examples, the hypervisor 110 can communicate this information to the virtual machine 112 by setting a capability property in a configuration space of a virtual component (e.g., virtual host bridge 202, a virtual bridge, or a virtual device) in the vPCI system 122. The configuration space can include memory-mapped device registers that indicate various attributes about the virtual component. Examples of the attributes can include a component type, a component identifier, specifications for system resources to be assigned to the component, vendor-specific capabilities, or any combination of these. In the examples shown in FIGS. 1-2, the hypervisor 110 has received input 124 indicating that one extra virtual bus is to be reserved and responsively set a "reserved_bus" capability property equal to "1" in the configuration space 126 for virtual bridge 204a.

Thereafter, as the virtual machine 112 starts up, the virtual machine 112 can assign a respective primary-bus number, secondary-bus number, and subordinate-bus number each existing virtual bridge in the vPCI system 122. In the example shown in FIG. 2, the virtual machine 112 has assigned virtual bridge 204a a primary-bus number of 0, because Bus 0 is immediately above the virtual bridge 204a in the vPCI system 122. The virtual machine 112 has also assigned virtual bridge 204a a secondary-bus number of 1, because Bus 1 is immediately below the virtual bridge 204a in the vPCI system 122. Additionally, the virtual machine 112 has initially determined that the virtual bridge 204a is to have a subordinate-bus number of 2, because Bus 2 is the highest subordinate-bus connected to the virtual bridge 204a. These values are indicated in dashed circle 210.

As part of the process for assigning the subordinate-bus number to each existing virtual bridge in the vPCI system 122, the virtual machine 112 can also determine if any extra virtual buses are to be reserved. For example, the virtual machine 112 can determine if any extra virtual buses are to be reserved by receiving a communication from the hypervisor 110 or querying the configuration space 126 to determine if the capability property is set. If the virtual machine 112 determines that extra virtual buses are to be reserved, the virtual machine 112 can reserve the extra virtual buses in the vPCI system 122 by increasing each respective subordinate-bus number for each existing virtual bridge in the vPCI system 122 by the number of extra virtual buses to be reserved. As a particular example, the virtual machine 112 can access the configuration space 126 for virtual bridge 204a and determine that the "reserved_bus" capability property is set to 1. Based on determining that this capability property is set to 1, the virtual machine 112 can increase the previously determined subordinate-bus number of the virtual bridge 204a by 1. More specifically, as shown in FIG. 2, the virtual machine 112 can add the value 1 to the subordinate-bus number of 2 to obtain an updated subordinate-bus number of 3. The virtual machine 112 can then assign the updated subordinate-bus number to the virtual bridge 204a. In some examples, the virtual machine 112 may also assign system resources to the virtual bridge 204a as if it already has three subordinate-buses already connected to it, even though it only has two subordinate-buses actually connected. This process can be repeated for virtual bridge 204b, which can be assigned an updated subordinate-bus number of 2 (because the virtual bridge 204b has one existing subordinate bus, Bus 2, and the one reserved bus). This process may also be repeated for the virtual host bridge 202.

The updated subordinate-bus number(s) for the virtual bridges 204a-b can be used to determine the virtual-bus maximum for the vPCI system 122. For example, the updated subordinate-bus number of 3 for the virtual bridge 204a can be used to determine the virtual-bus maximum for the vPCI system 122. Because Bus 0, Bus 1, and Bus 2 already exist in the vPCI system 122, this can allow for one additional virtual bus, Bus 3, to be added to the vPCI system at a later time. This, in turn, can allow one additional virtual bridge to be hot plugged into the vPCI system 122.

For example, after the virtual machine 112 has started up, the virtual bridge 204c can be connected to the vPCI system 122. The virtual machine 112 can detect the virtual bridge 204c and determine that the virtual-bus maximum for the vPCI system 122 is three. The virtual machine 112 can then scan the vPCI system to determine an unused bus number in the range between zero and the virtual-bus maximum. The virtual machine 112 can assign the unused virtual bus number to the additional bus corresponding to virtual bridge 204c. For example, the virtual machine 112 can determine that bus numbers 0, 1, and 2 are already in use, so the virtual machine 112 can assign the number three to the additional bus. In some examples, the virtual machine 112 can also designate this number as the secondary-bus number for virtual bridge 204c. For example, the virtual bridge 204c can be assigned a primary-bus number of 1, a secondary-bus number of 3, and because the virtual bridge 204c has no subordinate busses, a subordinate-bus number of zero.

Although the above examples describe the hypervisor 110 as performing certain steps and the virtual machine 112 as performing others, any number and combination of the components shown in FIG. 1 can implement any number and combination of the steps discussed herein. For instance, in one example, the virtual machine 112 (rather than the hypervisor 110) can receive the input indicating the number of extra buses to reserve and, in response, perform some or all of the abovementioned steps. The virtual machine 112 can implement any number and combination of steps using any number and combination of suitable software (e.g., the guest operating system 114, the guest firmware 116, or both).

Figure 3:
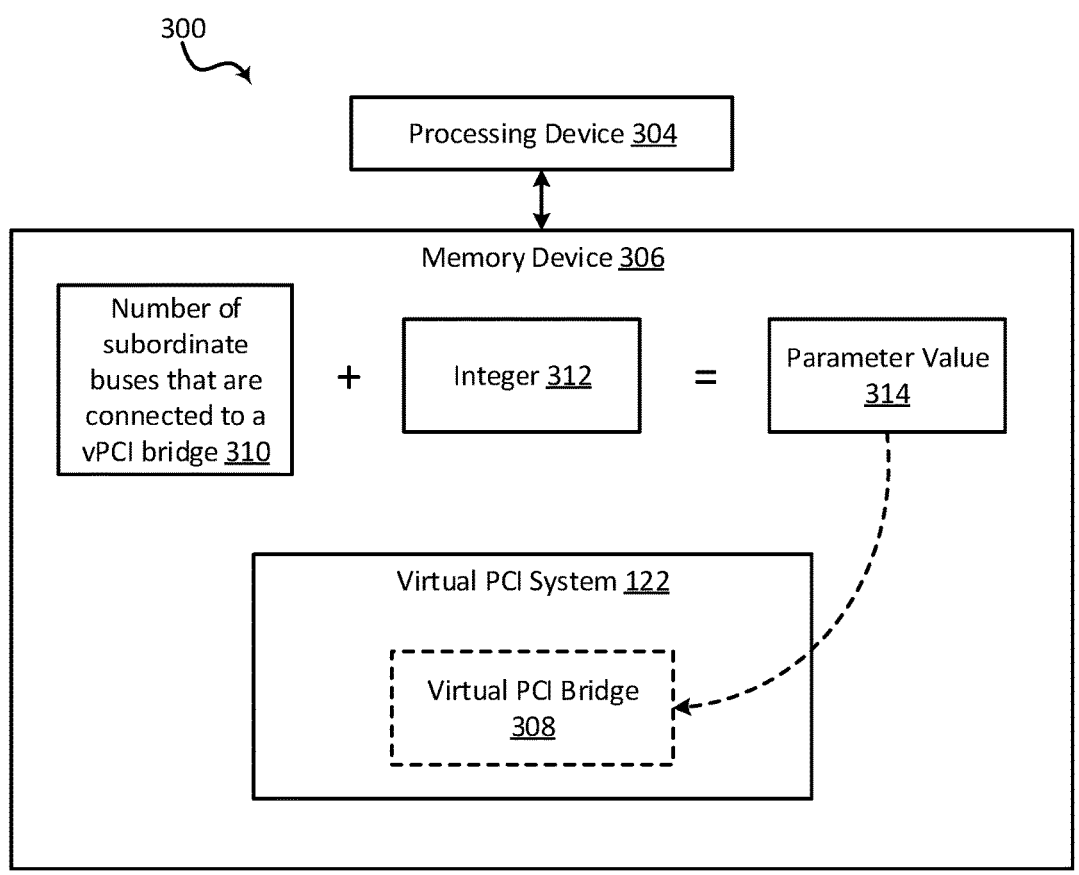
FIG. 3 is a block diagram of another example of a system for enabling hot plugging of virtual bridges according to some aspects.

FIG. 3 is a block diagram of another example of a system 300 for enabling hot plugging of virtual bridges according to some aspects. The system 300 includes a processing device 304 communicatively coupled to a memory device 306. In some examples, the processing device 304 and the memory device 306 can be the host processing device 104 and the host memory device 106, respectively, of FIG. 1.

The processing device 304 can include one processing device or multiple processing devices. Non-limiting examples of the processing device 304 include a Field-Programmable Gate Array (FPGA), an application-specific integrated circuit (ASIC), a microprocessor, etc. The processing device 304 can execute one or more operations for enabling hot plugging of virtual bridges in a vPCI system. The processing device 304 can execute instructions stored in the memory device 306 to perform the operations. In some examples, the instructions can include processor-specific instructions generated by a compiler or an interpreter from code written in any suitable computer-programming language, such as C, C++, C#, etc.

Memory device 306 can include one memory device or multiple memory devices. The memory device 306 can be non-volatile and may include any type of memory device that retains stored information when powered off. Non-limiting examples of the memory device 306 include electrically erasable and programmable read-only memory (EEPROM), flash memory, or any other type of non-volatile memory. In some examples, at least some of the memory device can include a medium from which the processing device 304 can read instructions. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 306 can include a vPCI system 122 with a vPCI bridge 308. Examples of the vPCI bridge 308 can include virtual host bridge 202, virtual bridge 204a, or virtual bridge 204b of FIG. 2. In some examples, the memory device 306 can also include a number 310 of subordinate buses that are connected to the vPCI bridge 308 of the vPCI system 122. The system 300 can determine the number 310 by scanning the vPCI system 122 to determine a hierarchical relationship between the buses in the vPCI system 122. The system 300 can then determine which bus or buses are subordinate to (e.g., beneath in the hierarchical relationship and directly or indirectly connected to) a secondary bus of the vPCI bridge 308. In some examples, the memory device 306 can also include an integer 312. The integer 312 can be a predefined number of additional subordinate buses to allow to be connected to the vPCI bridge (beyond the number 310 of subordinate buses already connected to the vPCI bridge). The integer 312 can be received as user input, generated by a software application, hard-coded into the system 300, or provided in another manner. In some examples, the memory device 306 can also include a parameter value 314. The system 300 can determine the parameter value 314 by adding the integer 312 to the number 310 of subordinated buses that are connected to the vPCI bridge 308. After determining the parameter value 314, the system 300 may assign the parameter value 314 to the vPCI bridge 308, as indicated by the dashed arrow in FIG. 3. For example, the system 300 may assign the parameter value as a subordinate-bus number for the vPCI bridge 308.

Figure 4:
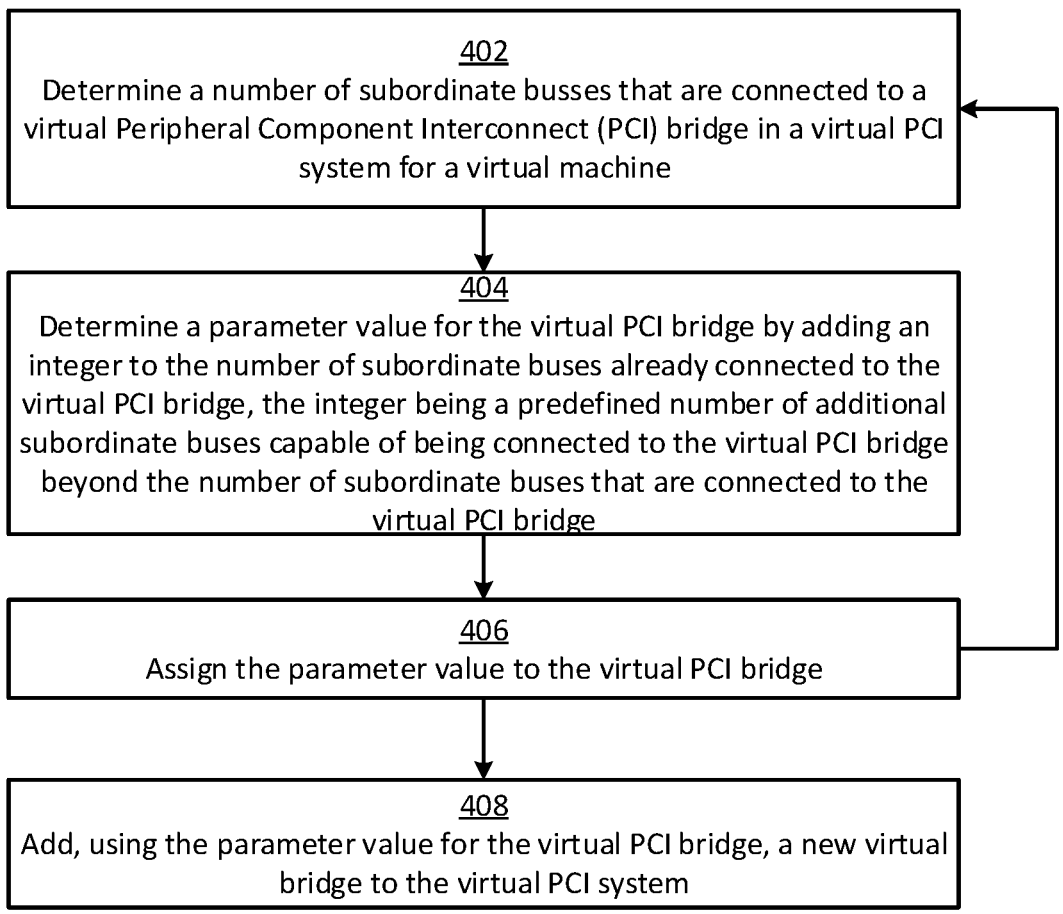
FIG. 4 is a flow chart of an example of a process for implementing some aspects of the present disclosure.

In some examples, the system 300 can implement the process shown in FIG. 4 to enable hot plugging of virtual bridges in a virtual PCI system. Other examples can include more steps, fewer steps, different steps, or a different combination of steps than shown in FIG. 4. The steps below are described with reference to components discussed above with respect to FIG. 3.

In block 402, a processing device 304 determines a number 310 of subordinate buses that are already connected to the vPCI bridge 308. The processing device 304 can determine the number 310 by analyzing the vPCI system 122 to determine how many buses exist in the vPCI system 122 that are subordinate to a secondary bus of the vPCI bridge 308.

In block 404, the processing device 304 determines a parameter value 314 by adding an integer 312 to the number 310 of subordinate buses that are already connected to the vPCI bridge 308. The integer 312 can be a predefined number of additional subordinate buses capable of being connected to the vPCI bridge 308 beyond the number of subordinate buses that are connected to the vPCI bridge 308. For example, the integer 312 can be a predefined number of buses to reserve for enabling additional virtual bridges to be hot plugged into the vPCI system 122.

In block 406, the processing device 304 assigns the parameter value 314 to the vPCI bridge 308. This may involve saving the parameter value 314 in a configuration space of the vPCI bridge 308 or elsewhere in the vPCI system 122. In some examples, the processing device 304 can assign the parameter value 314 as a subordinate-bus number for the vPCI bridge 308.

In some examples, the steps 402-406 can be performed (or repeated) for any number and combination of the virtual bridges in the vPCI system 122. For example, this process can be performed for the virtual host bridge 202, the virtual bridge 204a, and the virtual bridge 204b in FIG. 2.

In block 408, the processing device 304 adds a new virtual bridge to the vPCI system 122 using the parameter value 314 for the vPCI bridge 308. For example, the processing device 304 can hot plug the new virtual bridge into the vPCI system 122 using the parameter value 314 for the vPCI bridge 308.

In some examples, the processing device 304 can detect the addition of the new virtual bridge into the vPCI system 122. The processing device 304 can detect the addition of the new virtual bridge any time while the virtual machine is running, for example, during an operational phase for the virtual machine in which the virtual machine has already initialized the vPCI system 122. In response, the processing device 304 can identify an unused bus number from among a range of bus numbers having an upper limit defined by the parameter value 314 for the vPCI bridge 308. Then, the processing device 304 can assign the unused bus number to the new virtual bridge. This can effectuate the hot plugging of the new virtual bridge.

The processing device 304 can implement any number and combination of the above steps using any number and combination of suitable software (e.g., the guest operating system 114, the guest firmware 116, or both).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A method comprising:
    determining, by a processing device, a number of subordinate busses that are connected to a virtual Peripheral Component Interconnect (PCI) bridge in a virtual PCI system for a virtual machine;
    determining, by the processing device, a parameter value for the virtual PCI bridge by adding an integer to the number of subordinate buses already connected to the virtual PCI bridge, the integer being a predefined number of additional subordinate buses capable of being connected to the virtual PCI bridge beyond the number of subordinate buses that are connected to the virtual PCI bridge;
    assigning, by the processing device, the parameter value to the virtual PCI bridge; and
    adding, by the processing device using the parameter value for the virtual PCI bridge, a new virtual bridge to the virtual PCI system.

2. The method of claim 1, further comprising:
    receiving, by a hypervisor, the integer as user input;
    communicating, by the hypervisor, the integer to the virtual machine; and
    determining, by guest software of the virtual machine, the parameter value and assigning the parameter value to the virtual PCI bridge.

3. The method of claim 2, further comprising:
    communicating, by the hypervisor, the integer to the virtual machine by setting a capability property in a configuration space for the virtual PCI bridge;
    determining, by the guest software, that the capability property is set by querying the configuration space; and
    generating, by the guest software, the parameter value in response to determining that the capability property is set.

4. The method of claim 2, wherein adding the new virtual bridge to the virtual PCI system comprises:
    detecting, by the guest software, hot plugging of the new virtual bridge into the virtual PCI system;
    in response to detecting hot plugging of the new virtual bridge, identifying, by the guest software, an unused bus number from among a range of bus numbers having an upper limit defined by the parameter value for the virtual PCI bridge; and
    assigning, by the guest software, the unused bus number to the new virtual bridge.

5. The method of claim 4, wherein assigning the unused bus number to the new virtual bridge comprises:
    assigning a primary-bus number to the new virtual bridge, the primary-bus number representing a secondary bus for the virtual PCI bridge; and
    assigning a secondary-bus number to the new virtual bridge, the secondary-bus number being the unused bus number.

6. The method of claim 2, wherein the guest software is guest firmware or a guest operating system of the virtual machine.

7. The method of claim 1, wherein the virtual PCI bridge connects a root bus to a secondary bus of the virtual PCI system, and wherein at least one subordinate bus is connected to the virtual PCI bridge through the secondary bus.

8. The method of claim 1, further comprising receiving the integer as user input.

9. A system comprising:
    a processing device; and
    a memory device that includes instructions executable by the processing device for causing the processing device to:
        determine a number of subordinate busses that are connected to a virtual Peripheral Component Interconnect (PCI) bridge in a virtual PCI system for a virtual machine;
        determine a parameter value for the virtual PCI bridge by adding an integer to the number of subordinate buses already connected to the virtual PCI bridge, the integer being a predefined number of additional subordinate buses capable of being connected to the virtual PCI bridge beyond the number of subordinate buses that are connected to the virtual PCI bridge;
        assign the parameter value to the virtual PCI bridge; and add, using the parameter value for the virtual PCI bridge, a new virtual bridge to the virtual PCI system.

10. The system of claim 9, wherein the memory device further includes instructions that are executable by the processing device for causing the processing device to:
   execute a hypervisor associated with the virtual machine; and
   receive the integer as user input to the hypervisor.

11. The system of claim 10, wherein the memory device further includes instructions that are executable by the processing device for causing the processing device to:
   in response to receiving the user input via the hypervisor, set a capability property indicating the integer in a configuration space for the virtual PCI bridge;
   after setting the capability property, determine that the capability property is set by querying the configuration space; and
   in response to determining that the capability property is set, determine that the integer is associated with the capability property and generate the parameter value using the integer.

12. The system of claim 9, wherein the memory device further includes instructions that are executable by the processing device for causing the processing device to, after assigning the parameter value to the virtual PCI bridge:
   detect that the new virtual bridge is connected to the virtual PCI system;
   in response to detecting that the new virtual bridge is connected to the virtual PCI system, identify an unused bus number from among a range of bus numbers having an upper limit defined by the parameter value for the virtual PCI bridge; and
   assign the unused bus number to the new virtual bridge to enable the new virtual bridge to be used in the virtual PCI system.

13. The system of claim 12, wherein the memory device further includes instructions that are executable by the processing device for causing the processing device to assign a secondary-bus number to the new virtual bridge, the secondary-bus number being the unused bus number.

14. The system of claim 9, wherein the virtual PCI bridge connects a primary bus to a secondary bus of the virtual PCI system, and wherein at least one subordinate bus is connected to the virtual PCI bridge through the secondary bus.

15. The system of claim 9, wherein the memory device further includes instructions that are executable by the processing device for causing the processing device to cause guest firmware of a virtual machine to generate the parameter value and assign the parameter value to the virtual PCI bridge.

16. A non-transitory computer-readable medium comprising instructions that are executable by a processing device for causing the processing device to:
   determine a number of subordinate busses that are connected to a virtual Peripheral Component Interconnect (PCI) bridge in a virtual PCI system for a virtual machine;
   determine a parameter value for the virtual PCI bridge by adding an integer to the number of subordinate buses already connected to the virtual PCI bridge, the integer being a predefined number of additional subordinate buses capable of being connected to the virtual PCI bridge beyond the number of subordinate buses that are connected to the virtual PCI bridge;
   assign the parameter value to the virtual PCI bridge; and
   add, using the parameter value for the virtual PCI bridge, a new virtual bridge to the virtual PCI system.

17. The non-transitory computer-readable medium of claim 16, further comprising instructions that are executable by the processing device for causing the processing device to:
   execute a hypervisor associated with the virtual machine; and
   receive the integer as user input to the hypervisor.

18. The non-transitory computer-readable medium of claim 17, further comprising instructions that are executable by the processing device for causing the processing device to, in response to receiving the user input, communicate the integer to the virtual machine.

19. The non-transitory computer-readable medium of claim 16, further comprising instructions that are executable by the processing device for causing the processing device to, after assigning the parameter value to the virtual PCI bridge:
   detect that the new virtual bridge is connected to the virtual PCI bridge in the virtual PCI system;
   in response to detecting that the new virtual bridge is connected to the virtual PCI bridge, identify an unused bus number from among a range of bus numbers having an upper limit defined by the parameter value for the virtual PCI bridge; and
   assign the unused bus number to the new virtual bridge to hot plug the new virtual bridge into the virtual PCI system.

20. The non-transitory computer-readable medium of claim 19, further comprising instructions that are executable by the processing device for causing the processing device to:
   assign a primary-bus number to the new virtual bridge, the primary-bus number representing a secondary bus for the virtual PCI bridge; and
   assign a secondary-bus number to the new virtual bridge, the secondary-bus number being the unused bus number.

21. The non-transitory computer-readable medium of claim 16, wherein the virtual PCI bridge connects a primary bus to a secondary bus of the virtual PCI system, and wherein at least one subordinate bus is connected to the virtual PCI bridge through the secondary bus.

* * * * *